(12) United States Patent
Nakayama et al.

(10) Patent No.: US 10,726,409 B2
(45) Date of Patent: Jul. 28, 2020

(54) POINT-OF-SALE SYSTEM WITH MOVABLE RECEIPT PRINTER

(71) Applicant: TOSHIBA TEC KABUSHIKI KAISHA, Tokyo (JP)

(72) Inventors: Tadashi Nakayama, Mishima Shizuoka (JP); Kazuyuki Matsumura, Numazu Shizuoka (JP); Ryohei Miyoshi, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 337 days.

(21) Appl. No.: 15/704,059

(22) Filed: Sep. 14, 2017

(65) Prior Publication Data

US 2018/0089659 A1    Mar. 29, 2018

(30) Foreign Application Priority Data

Sep. 23, 2016   (JP) .................... 2016-185587

(51) Int. Cl.
*G06Q 20/20* (2012.01)
*G07D 11/14* (2019.01)
(Continued)

(52) U.S. Cl.
CPC .......... *G06Q 20/209* (2013.01); *B41J 15/042* (2013.01); *G07D 11/14* (2019.01);
(Continued)

(58) Field of Classification Search
CPC ..... G06Q 20/209; B41J 15/042; G07D 11/14; G07G 1/0018; G07G 1/01; G07G 1/12; G07G 5/00
See application file for complete search history.

(56) References Cited

U.S. PATENT DOCUMENTS 5,969,691 A * 10/1999 Myers ................... G07F 13/025
                                                  222/23
6,241,149 B1 * 6/2001 Baitz ...................... G06F 3/021
                                                  235/375
(Continued)

FOREIGN PATENT DOCUMENTS

EP          0798122 A2    10/1997
GB          2535970 A     9/2016
(Continued)

OTHER PUBLICATIONS

Vargas, Camilo. "Universal Design of a Future Grocery Retail Checkstand". Master of Industrial Design Thesis, Georgia Tech School of Architecture. Aug. 2008. (Year: 2008).*

(Continued)

*Primary Examiner* — Nathan A Mitchell
(74) *Attorney, Agent, or Firm* — Kim & Stewart LLP

(57) ABSTRACT

A point-of-sale (POS) system includes a counter, a cash processing machine, and a register machine. The cash processing machine has a cash receiving port and a cash dispensing port that are accessible from a first lateral side of the counter but not a second lateral side of the counter that is opposite to the first lateral side. The register machine has a display and an operational panel and coupled with the cash processing machine such that the display and the operational panel face the second lateral side.

11 Claims, 6 Drawing Sheets

(51) Int. Cl.
*G07G 5/00* (2006.01)
*B41J 15/04* (2006.01)
*G07G 1/00* (2006.01)
*G07G 1/01* (2006.01)
*G07G 1/12* (2006.01)

(52) U.S. Cl.
CPC ............ *G07G 1/0018* (2013.01); *G07G 1/01* (2013.01); *G07G 1/12* (2013.01); *G07G 5/00* (2013.01)

(56) References Cited

U.S. PATENT DOCUMENTS

| | | | |
|---|---|---|---|
| 6,286,758 B1 | 9/2001 | Dejaeger et al. | |
| 10,319,197 B2* | 6/2019 | Sugita | G07G 1/0018 |
| 2002/0189502 A1* | 12/2002 | Kerber | A47F 9/046 |
| | | | 108/42 |
| 2003/0116618 A1* | 6/2003 | Moriya | G07G 1/0027 |
| | | | 235/22 |
| 2006/0037835 A1* | 2/2006 | Doran | G06Q 20/10 |
| | | | 194/302 |
| 2006/0038009 A1* | 2/2006 | Russell | A47F 9/04 |
| | | | 235/383 |
| 2009/0198582 A1* | 8/2009 | Tokorotani | G06Q 20/204 |
| | | | 705/17 |
| 2010/0191603 A1* | 7/2010 | Herwig | G06Q 20/18 |
| | | | 705/14.65 |
| 2011/0047092 A1* | 2/2011 | Taylor | G06Q 10/08 |
| | | | 705/333 |
| 2012/0224201 A1 | 9/2012 | Asahina | |
| 2013/0015242 A1* | 1/2013 | White | G06K 7/10554 |
| | | | 235/383 |
| 2014/0252089 A1* | 9/2014 | Bostwick | G06Q 20/203 |
| | | | 235/383 |
| 2015/0145915 A1 | 5/2015 | Thomas et al. | |
| 2016/0051067 A1* | 2/2016 | Law | F16M 11/041 |
| | | | 361/679.22 |

FOREIGN PATENT DOCUMENTS

| | | |
|---|---|---|
| JP | 2016027449 A | 2/2016 |
| WO | 2016013230 A1 | 1/2016 |

OTHER PUBLICATIONS

European Search Report dated Feb. 20, 2018, mailed in counterpart European Application No. 17190431.6, 9 pages.

* cited by examiner

POINT-OF-SALE SYSTEM WITH MOVABLE RECEIPT PRINTER

CROSS-REFERENCE TO RELATED APPLICATION

This application is based upon and claims the benefit of priority from Japanese Patent Application No. 2016-185587, filed Sep. 23, 2016, the entire contents of which are incorporated herein by reference.

FIELD

An embodiment described herein relates generally to a point-of-sale (POS) system.

BACKGROUND

In the related art, sales data processing devices such as registers, POS terminal devices, self-service checkout devices, and semi-self-service checkout devices are used in retailers. For example, in a bakery, fast food shops, and the like, an operator of the sales data processing device may handle cash for payment, and also packaging or bagging of food products, especially, non-packaged food products. Since cash is generally touched by many people throughout circulation, infectious bacterium and virus may spread. For that reason, it is more preferable that operators dealing with food products do not touch cash when the operator handles food products at the checkout. Further, even in a retailer dealing with non-food products, it may be preferable that operators do not handle cash.

DETAILED DESCRIPTION

An embodiment provides a sales data processing device that enables cash-based checkout without touching cash by an operator.

In general, according to an embodiment, a point-of-sale (POS) system includes a counter, a cash processing machine, and a register machine. The cash processing machine has a cash receiving port and a cash dispensing port that are accessible from a first lateral side of the counter but not a second lateral side of the counter that is opposite to the first lateral side. The register machine has a display and an operational panel and coupled with the cash processing machine such that the display and the operational panel face the second lateral side.

Figure 1:
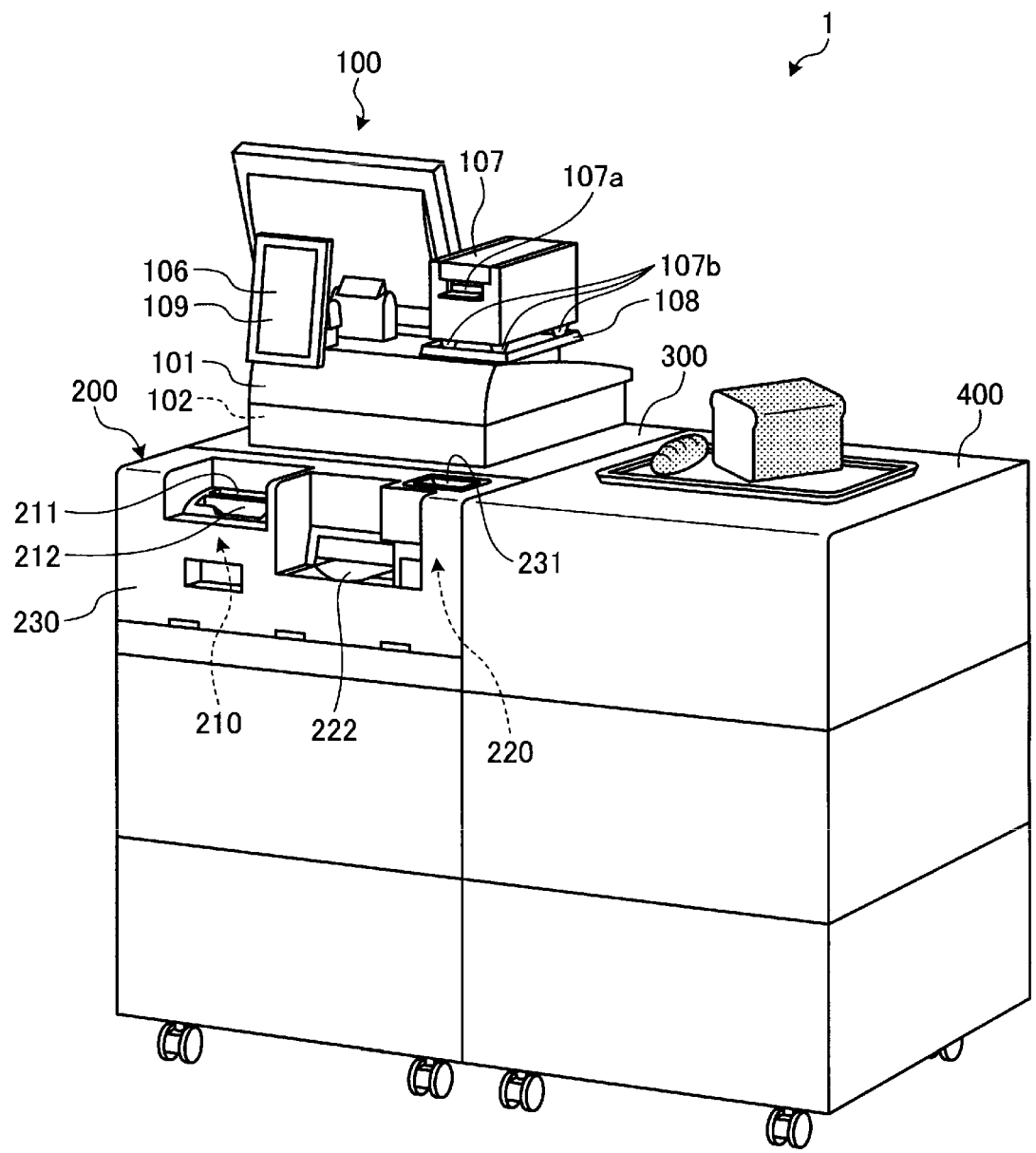
FIG. 1 is a perspective view of a register counter according to an embodiment.

An embodiment will be described with reference to the drawings. FIG. 1 is a perspective view of a register counter 1. For example, the register counter 1 is an example of a sales data processing device, and used for checkout in a bakery shop or the like. For checkout, a salesperson as an operator stands behind the register counter 1 in FIG. 1, and a customer stands in front of the register counter 1. That is, the register counter 1 is used for checkout at a position interposed between the operator and the customer.

The register counter 1 includes a POS terminal device 100, a payment machine 200, a cashier table 300, and a sacker table 400.

The sacker table 400 is a work table having a flat upper surface, and used as a place for placing and packing merchandise. The POS terminal device 100 is placed on the upper surface of the casher table 300 and the payment machine 200 is also mounted on a front upper portion of the casher table 300. In addition, the cashier table 300 is provided to align an upper portion thereof with an upper surface of the sacker table 400 and functions as a table continuous from the sacker table 400. The cashier table 300 and the sacker table 400 include storage shelves 301 and 401 (see FIG. 2) that are open to an operator side.

Figure 2:
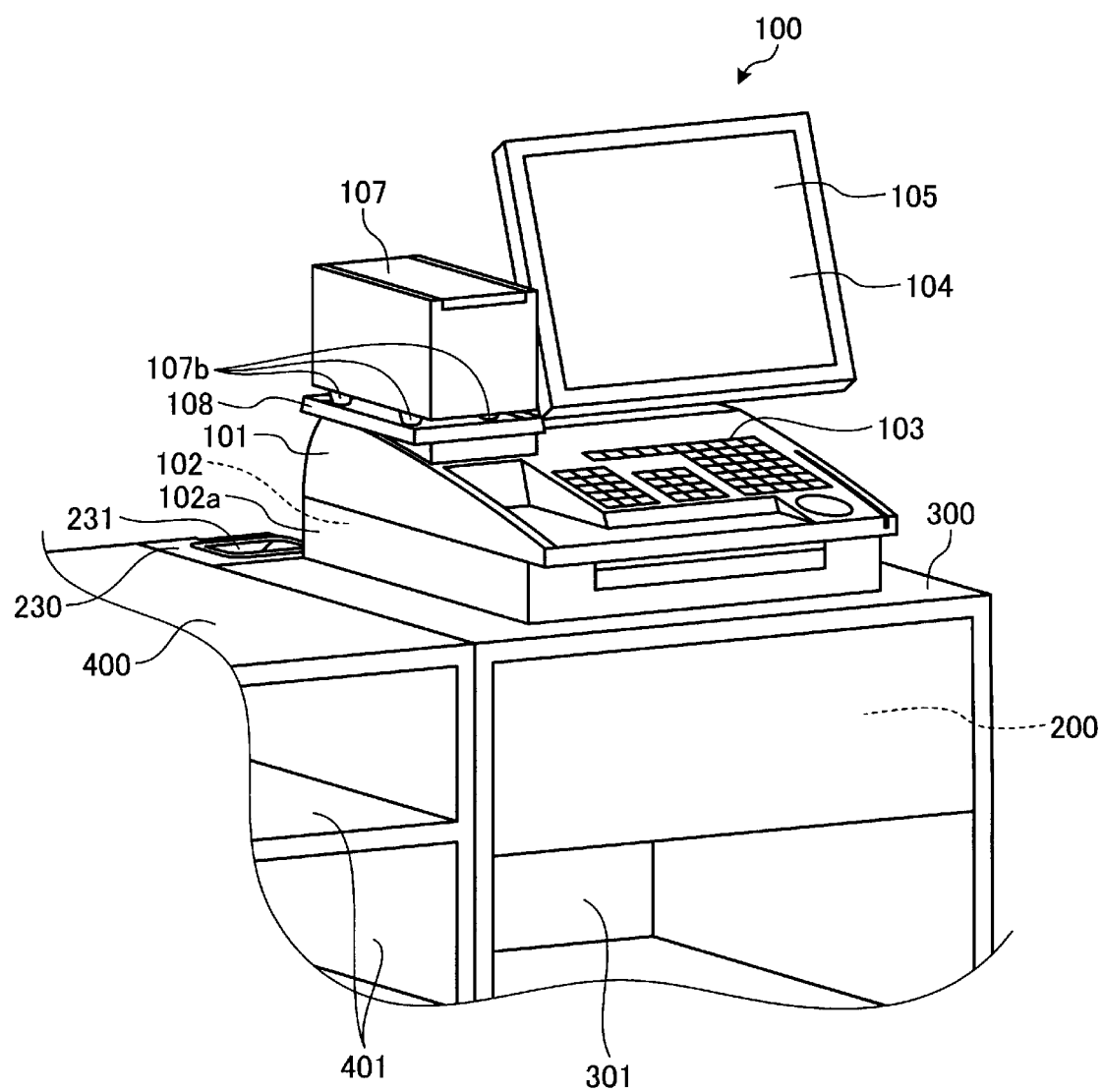
FIG. 2 is a perspective view of a peripheral portion of a POS terminal device of the register counter.

FIG. 2 illustrates an opposite side of the register counter 1 to the side shown in FIG. 1, and is a perspective view showing an appearance of a peripheral portion of the POS terminal device 100 of the register counter 1. The POS terminal device 100 includes a main body unit 101, a control unit 102, a keyboard 103, a touch panel 104, a display unit 105, a sub display unit 106 (see FIG. 1), a printer 107, and a printer table 108.

The main body unit 101 is a base part of each unit, and the display unit 105 or the like in which the keyboard 103 is provided is attached thereto.

The control unit 102 manages the POS terminal device 100 and the payment machine 200, and is configured with a central processing unit (CPU), a read only memory (ROM), a random access memory (RAM), and the like. The control unit 102 is accommodated in a thin box shape housing 102a under the main body unit 101.

The main body unit 101 and the housing 102a are bodies separated from each other. Therefore, it is also possible to place the housing 102a including the control unit 102 on a storage shelf 301 or the like separated from the main body unit 101.

The display unit 105 is provided to stand on the back side in FIG. 2 on an upper surface of the main body unit 101, and a screen is directed toward the operator, and displays information for the operator.

The keyboard 103 and the touch panel 104 configure an operation unit. The keyboard 103 is provided on the front side of the upper surface of the main body unit 101. The touch panel 104 is provided on a front surface of the display unit 105 and receives an operation made in accordance with display content of the display unit 105.

The sub display unit 106 is attached to the rear surface of the main body unit 101, directs a screen thereof toward the customer side, and displays information to be sent to the customer. In addition, a touch panel 109 is provided on a front surface of the sub display unit 106. The touch panel 109 receives an operation made in accordance with display content of the sub display unit 106. The sub display unit 106 and the touch panel 109 function as an example of a display operation unit.

Figure 3:
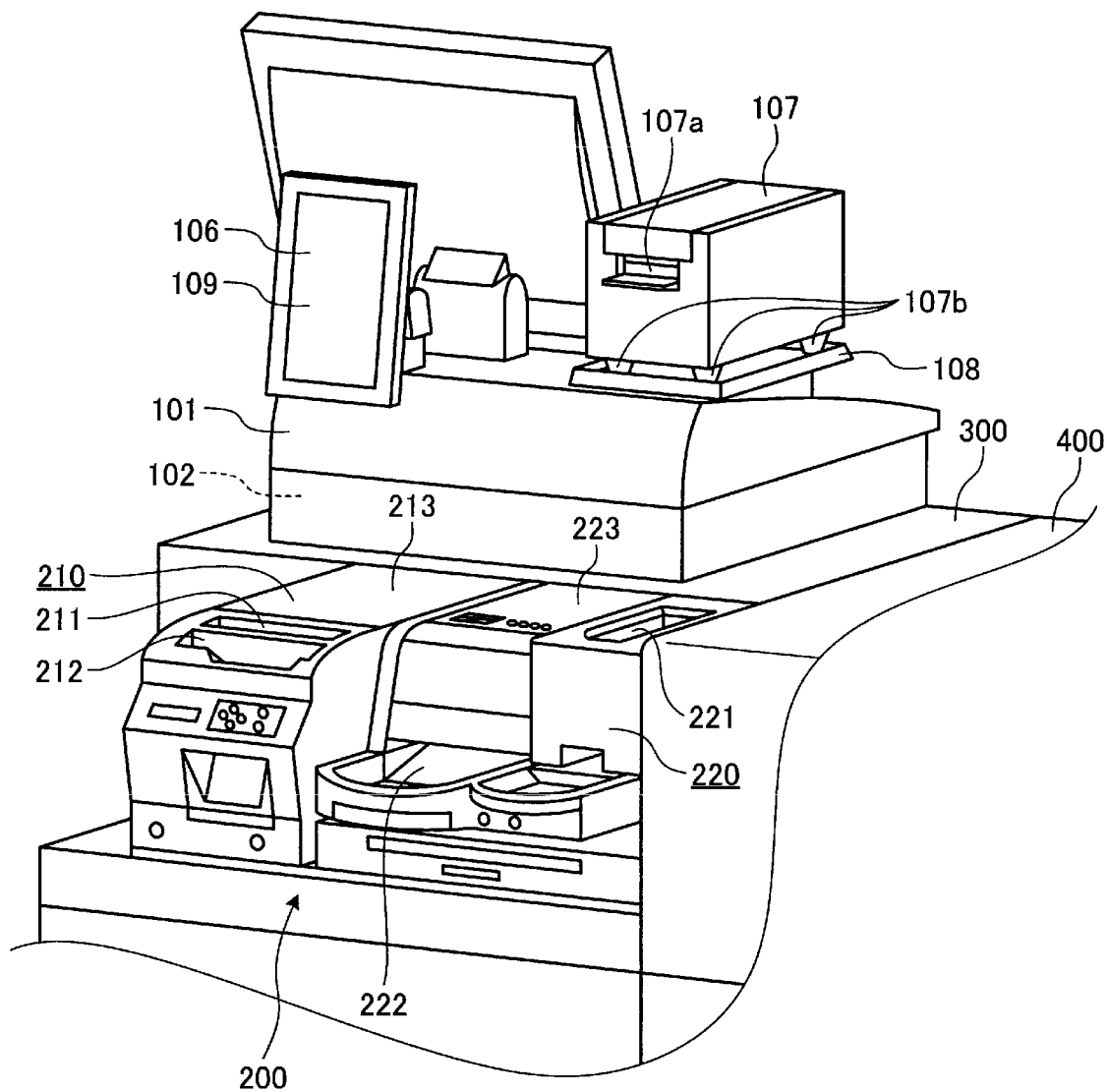
FIG. 3 is a perspective view of a payment machine of which a cover is removed.

The payment machine 200 is an example of a cash handling unit, receives cash, and performs payment of change. The payment machine 200 includes a bill depositing and dispensing device 210, a coin depositing and dispensing device 220, and a cover 230. FIG. 3 is a perspective view of the payment machine 200 from which the cover 230 is removed. FIG. 3 illustrates a view seen from the same side as that of FIG. 1 (opposite side of FIG. 2).

The bill depositing and dispensing device 210 includes a bill depositing unit 211, a bill dispensing unit 212, and a bill storage unit (not shown). The bill depositing unit 211 takes bills into a housing 213 from the outside. The bill storage unit is provided inside the housing 213, and accommodates the bills taken by the bill depositing unit 211. The bill dispensing unit 212 dispenses bills as changes by taking out the bills from the bill storage unit.

The coin depositing and dispensing device 220 includes a coin depositing unit 221, a coin dispensing unit 222, and a coin storage unit (not shown). The coin depositing unit 221 takes coins into a housing 223 from the outside. The coin storage unit is provided inside the housing 223, and accommodates the coins taken by the coin depositing unit 221 therein. The coin dispensing unit 222 dispenses coins as changes by taking out the coins from the bill storage unit.

The cover 230 covers the bill depositing and dispensing device 210 and the coin depositing and dispensing device 220, and prevents operation buttons or the like of the bill depositing and dispensing device 210 and the coin depositing and dispensing device 220 from being erroneously operated by the customer.

The cover 230 includes a coin depositing port 231. The coin depositing port 231 is formed as a funnel shape, is located on the coin depositing unit 221, and guides the inserted coin to the coin depositing unit 221. In addition, the cover 230 includes holes for exposing the bill depositing unit 211 and the bill dispensing unit 212, and a hole for exposing the coin dispensing unit 222.

Such a payment machine 200 receives deposit to the bill depositing unit 211 and the coin depositing unit 221, and cash equivalent to changes is dispensed from both or one of the bill dispensing unit 212 and the coin dispensing unit 222 in a case where the changes are necessary in relation to the depositing.

The printer 107 prints and issues a receipt. The printer 107 is placed on the printer table 108. The orientation of the printer 107 can be changed with respect to the printer table 108. The printer 107 of the embodiment is configured by selecting one of a customer orientation and an operator orientation. However, the orientation at the time of performing the embodiment may be selected as three or more orientations.

Figure 4:
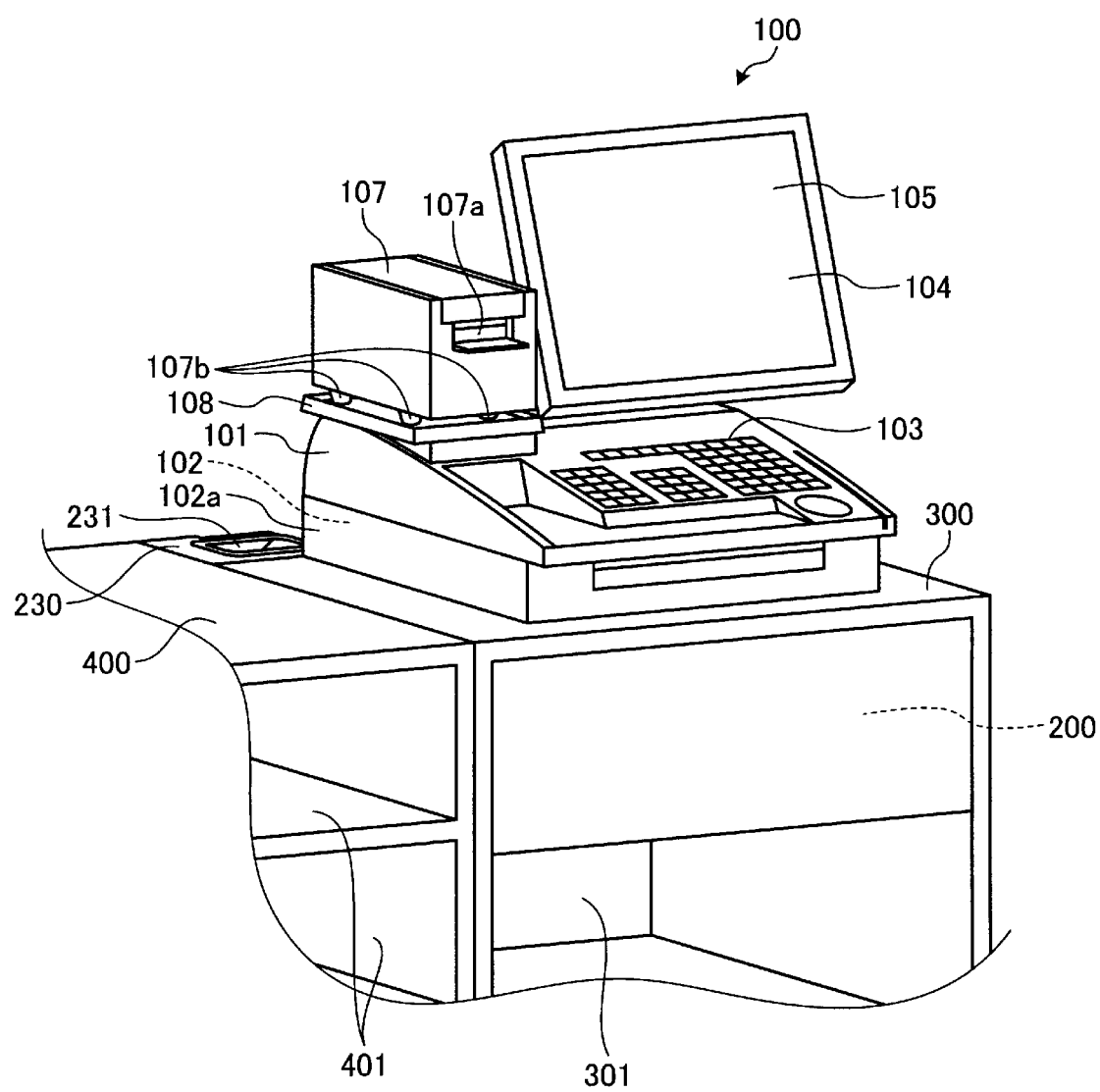
FIG. 4 is a perspective view of a peripheral portion of a POS terminal device of the register counter.

FIG. 4 is a perspective view of a peripheral portion of the POS terminal device 100 of the register counter 1. FIG. 4 illustrates a view seen from the same side as that of FIG. 2. Difference between FIG. 2 and FIG. 4 is the orientation of the printer 107. For example, the orientation of the printer 107 can be manually changed. The printer 107 uses a paper discharge port 107a for discharging the receipt toward a customer side or an operator side. FIG. 1 to FIG. 3 illustrate a state where the paper discharge port 107a faces the customer side. FIG. 4 illustrates a state where the paper discharge port 107a faces the operator side.

In addition, the printer 107 includes four legs 107b on a bottom surface thereof. The legs 107b are made of, for example, rubber in order to reduce transmission of vibrations or to prevent positional deviation due to slipping.

Figure 5A:
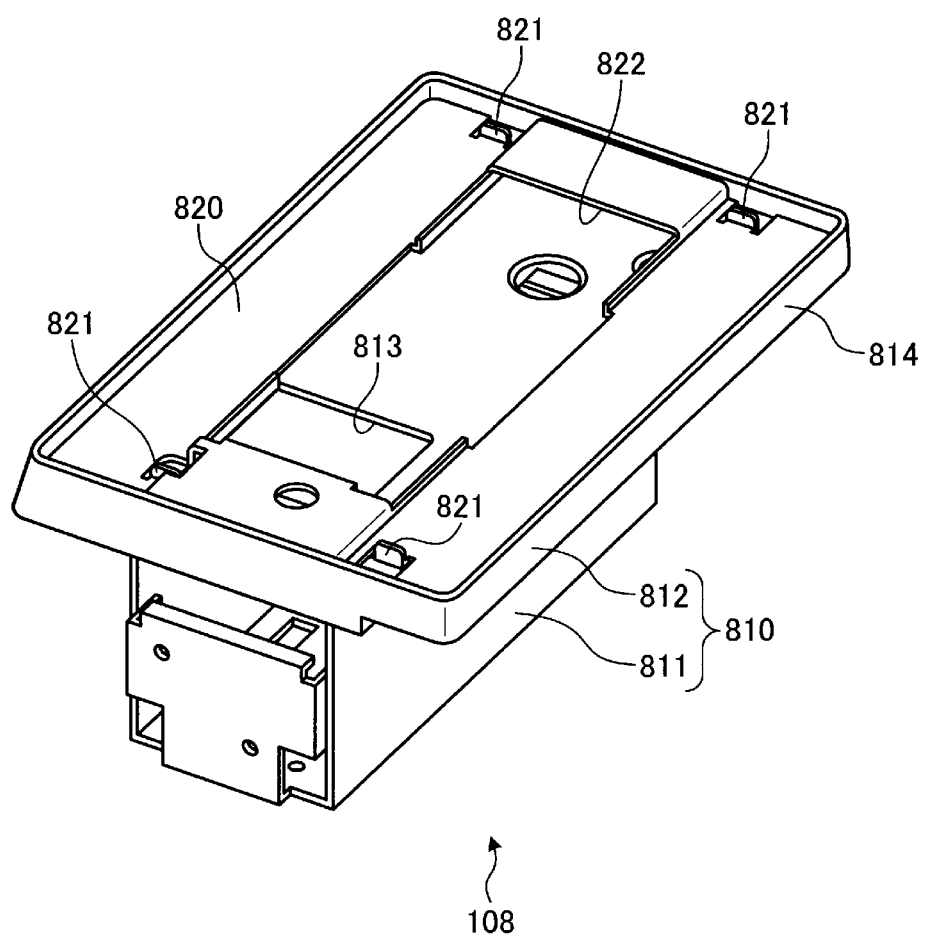
FIG. 5A is a perspective view of a printer table.
Figure 5B:
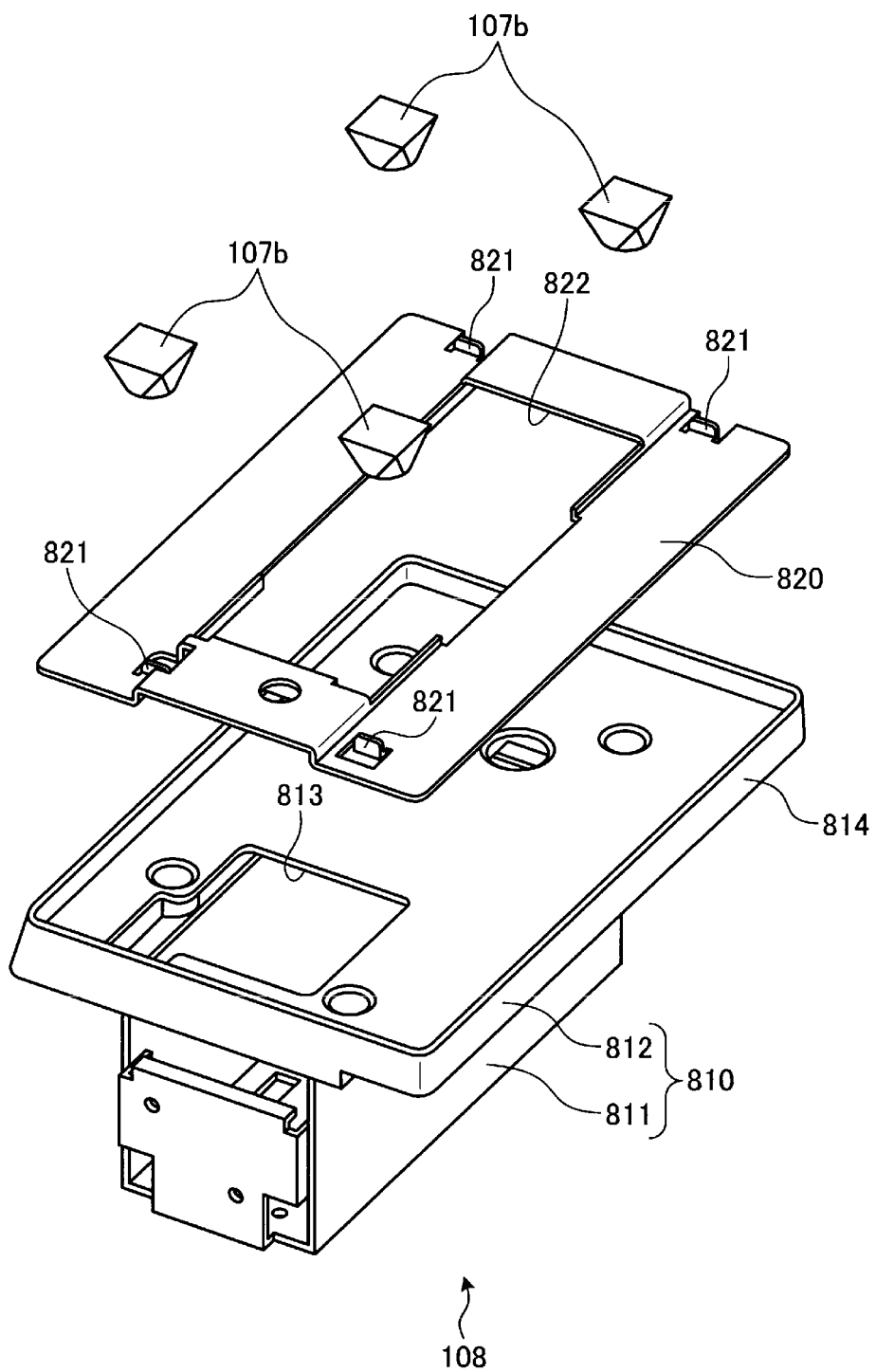
FIG. 5B is an exploded perspective view of the printer table.

FIG. 5A is a perspective view of the printer table 108. FIG. 5B is an exploded perspective view showing a structure of the printer table 108. The printer table 108 includes a base 810 and a top plate 820.

The base 810 includes a leg portion 811 and a base portion 812. The leg portion 811 is a portion attached to the main body unit 101, and the base portion 812 is fixed on an upper portion thereof. The base portion 812 is an approximately horizontal flat plate shape portion having the same size and shape as those of the printer 107 projected in a plan view, and is located on the leg portion 811. The base portion 812 includes a hole 813 through which a cable (not shown) for connecting the main body unit 101 and the printer 107 passes.

The top plate 820 is a metal sheet that directly supports the printer 107, and is fit in the base portion 812. The top plate 820 includes claws 821 for precisely setting positions of the legs 107b of the printer 107. In addition, the top plate 820 includes a hole 822 for passing through the cable passing through the hole 813. The top plate 820 is fit in a position lower than an upper end of a rib 814 in which the base portion 812 is implemented on an outer peripheral portion.

The control unit 102 is an example of a data processing unit, and performs registration of an item to be sold to a customer and calculation of the price of the item based on an operation received by the operation unit. In addition, the control unit 102 receives payment for price by the payment machine 200.

In the register counter 1 of the configuration described above, the operator stands on the back side in FIG. 1 and performs procedures related to checkout of merchandise placed on the sacker table 400 by customers who are on the front side in FIG. 1.

The operator visually checks the merchandise, performs the registration of the sales data through the POS terminal device 100, and requests the customer to pay the price. The customer deposits money to the payment machine 200 according to the amount of money requested, and receives changes if the changes are dispensed. In addition, the operator performs packing of the merchandise and filling of a bag, and hands over the merchandise to the customer after completing the checkout.

The printer 107 discharges a receipt in which details of the purchased merchandise or the like are recorded in accordance with depositing and dispensing in the payment machine 200. If the paper discharge port 107a is directed toward the customer side, the customer takes directly the receipt. In addition, if the paper discharge port 107a is directed toward the operator side, the operator hands over the receipt to the customer.

According to such an embodiment, since the operator can complete checkout without touching cash, it is possible to realize a sanitary operation, and it is possible to expect an effect of reducing spreading path of infectious diseases.

In addition, according to the configuration of the present embodiment, it is possible to determine the orientation of the paper discharge port 107a of the printer 107 according to the store policy. For example, since there is no hygienic problem for the receipt unlike the cash, a polite impression may be given to the customer by handing over the receipt to the customer by the operator, or a time required for checkout may be reduced by taking the receipt by the customers.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A point-of-sale (POS) system comprising:
a counter;
a cash processing machine having a cash receiving port and a cash dispensing port that are accessible from a first lateral side of the counter but not a second lateral side of the counter that is opposite to the first lateral side;
a register machine having a display and an operational panel and coupled with the cash processing machine such that the display and the operational panel face the second lateral side; and
a receipt printer having a receipt outlet from which a receipt is ejected, the receipt printer being movable between a first position in which the receipt outlet is closer to the first lateral side than the second lateral side and a second position in which the receipt outlet is closer to the second lateral side than the first lateral side, wherein
the receipt printer is placed on a top surface of a platform formed in the register machine,
the platform includes a main body and a top plate that is attached to the main body and on which the receipt printer is placed, and
the top plate includes one or more guides on a first end portion thereof and one or more guides on a second end portion that is opposite to the first end portion, the one or more guides on the first end portion and the one or more guides on the second end portion are spaced apart such that a bottom portion of the receipt printer fits therebetween and a move of the receipt printer in a direction from the first end portion to the second end portion and in a direction from the second end portion to the first end portion is restricted.

2. The POS system according to claim 1, wherein
each of the one or more guides on the first end portion comprises a protrusion that extends upward and has a surface formed along an edge of the top plate in the first end portion, and
each of the one or more guides on the second end portion comprises a protrusion that extends upward and has a surface formed along an edge of the top plate in the second end portion.

3. The POS system according to claim 1, wherein the first end portion of the top plate faces a same side as the operation panel.

4. The POS system according to claim 1, wherein each of the main body and the top plate of the platform has an opening through which a cable connected to the receipt printer passes.

5. The POS system according to claim 1,
wherein the receipt printer is coupled with the register machine, such that the receipt outlet of the receipt printer faces the first lateral side to eject the receipt towards the first lateral side.

6. The POS system according to claim 1, further comprising:
wherein the receipt printer is coupled with the register machine, such that the receipt outlet of the receipt printer faces the second lateral side to eject the receipt towards the second lateral side.

7. The POS system according to claim 1, wherein the register machine is detachably placed above a top surface of the cash processing machine.

8. The POS system according to claim 1, wherein the cash receiving port includes a coin receiving port and a bill receiving port both of which face upward.

9. The POS system according to claim 8, wherein the cash dispensing port includes a coin dispensing port and a bill dispensing port both of which face upward.

10. The POS system according to claim 1, wherein the register machine further includes a second display facing in a direction opposite to a direction in which the display faces.

11. The POS system according to claim 1, wherein the first lateral side is a customer side that faces a customer.

* * * * *